United States Patent [19]

Richards

[11] Patent Number: 5,492,292
[45] Date of Patent: Feb. 20, 1996

[54] DEVICE FOR SUPPORTING AND STABILIZING FURNITURE

[76] Inventor: Jeffrey Richards, 1801 E. Tropicana, #9, Las Vegas, Nev. 89119

[21] Appl. No.: 56,863

[22] Filed: May 5, 1993

[51] Int. Cl.⁶ .................................................... F16M 11/24
[52] U.S. Cl. .......................... 248/188.2; 254/104
[58] Field of Search ................... 248/188.2; 254/104; 52/126; 182/201, 204, 205, 107

[56] References Cited

U.S. PATENT DOCUMENTS

| | | | |
|---|---|---|---|
| 1,045,984 | 12/1912 | King | 254/104 |
| 2,709,571 | 5/1955 | Mafera | 248/188.2 X |
| 3,030,730 | 4/1962 | Costar | 248/188.2 |
| 3,993,275 | 11/1976 | Lucas | 182/107 |
| 4,135,335 | 1/1979 | Jensen | 52/126 |
| 4,625,489 | 12/1986 | Bogle | 52/126.1 X |
| 4,776,548 | 10/1988 | Bezenek | 254/104 X |
| 4,830,320 | 5/1989 | Bellows | 254/104 X |
| 4,858,865 | 8/1989 | Schrepfer | 248/188.2 |
| 5,249,767 | 10/1993 | Mellen | 254/104 X |

FOREIGN PATENT DOCUMENTS 2516129  10/1976  Germany ............................ 248/188.2

*Primary Examiner*—J. Franklin Foss
*Attorney, Agent, or Firm*—Ellen C. Childress

[57] ABSTRACT

A device adapted to stabilize an article of furniture on a support surface is formed as two wedge-shaped pieces so constructed that they slide into each other thereby causing a furniture leg to be raised or lowered. The mechanism for holding the two parts together is such as to prevent them from coming apart or being forced apart by the weight of the supported object. The construction material is stiff, yet flexible and resilient, to help stabilize the article of furniture, and may be an anti-skid material. The upper surfaces of the device deviate from a plane so as to provide a very small height correction without compromising stability.

19 Claims, 7 Drawing Sheets

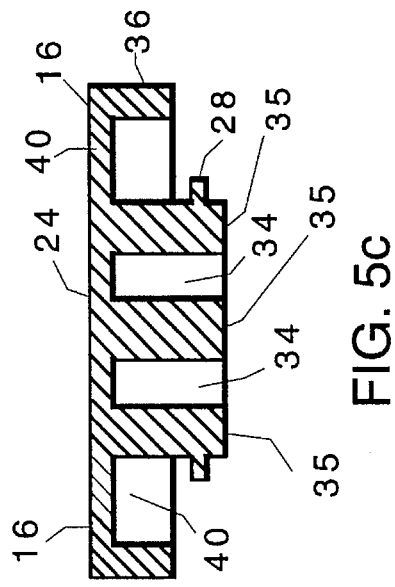
FIG. 5a
FIG. 5b
FIG. 5c
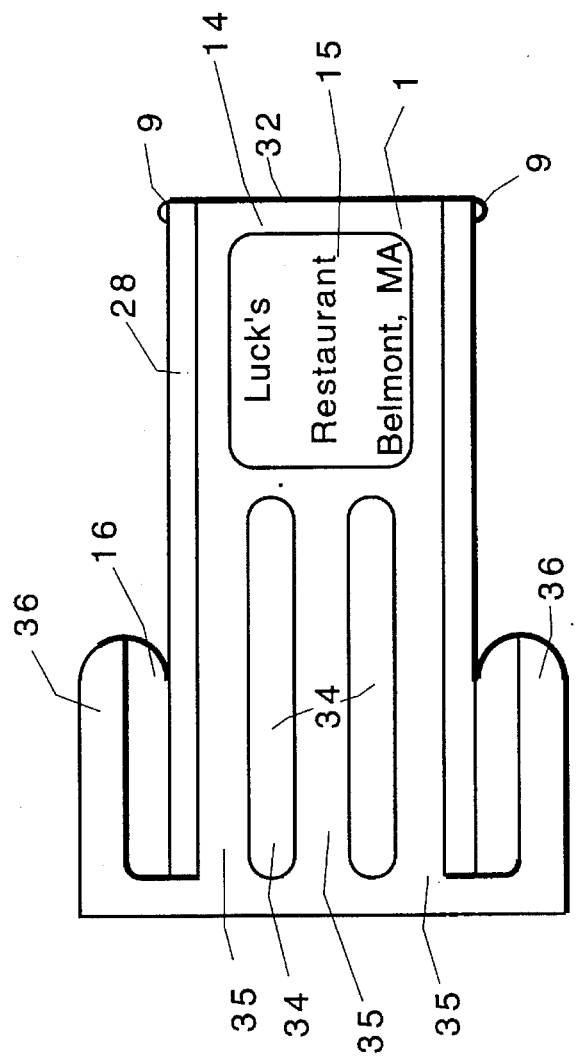
FIG. 6

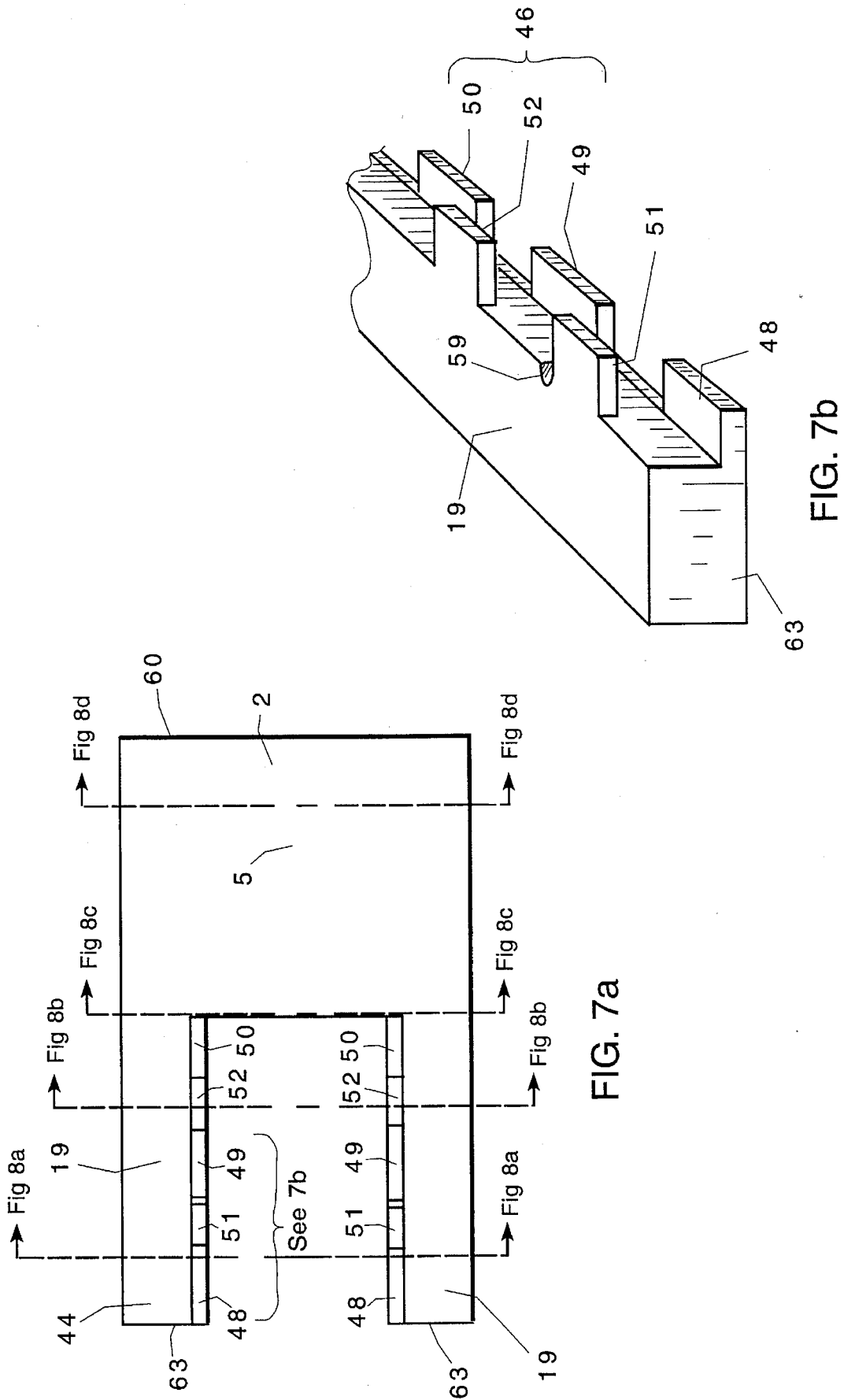

DEVICE FOR SUPPORTING AND STABILIZING FURNITURE

FIELD OF INVENTION

The field of the present invention is directed to levelling and stabilizing articles of furniture and the like which rest on a support surface. More specifically, the present invention is directed to devices adapted to be inserted between a support surface and the lower support structure or structures of an article of furniture or appliance.

BACKGROUND

Many pieces of furniture and appliances are supported by legs. If the legs are of unequal length or the supporting surface is uneven an instability occurs which manifests itself as tipping or wobbling under perturbations to the article of furniture, jarring forces and the like. Stabilizing devices may also be used to help level an otherwise evenly supported article on a support surface.

For example, a typical table has a horizontal dining surface oriented parallel to the floor and supported by four downwardly depending legs. Thus, the support plane of this table is the plane defined by the free ends of the legs. However, geometry dictates that only three support points define a plane. Thus, it is necessary that table legs be sized with great care in order to ensure that all four free ends terminate in a common plane; otherwise, the table will be unstable.

Most articles of furniture are usually supported by lower support members which indeed have a number of potential support points in excess of three. These include, by way of example, articles of furniture, such as the table, above, which have four or more downwardly depending legs, articles which have horizontal runners adapted to abut the support surface and pedestal supported articles. Unless care is taken, it is possible that the lower support structure of these articles does not terminate in a common support plane. When this happens, the article of furniture does not have a single stable support plane but rather is subject to unwanted wobbling or tipping. Even with articles of furniture which have only three support points, such as a three legged table, automatically defining a stable support plane, the working surface may be tilted due to an error in the length of any support.

Given the foregoing, there have been a number of inventions made to level or otherwise stabilize. Some articles of furniture are provided with adjustable pads on their lower supports such pads typically being threaded bolts which terminate in support pads or heads. These threaded bolts move into and out of the lower supports to define an adjustable support plane. Other techniques of levelling items such as heavy machinery include the use of a pair of freely sliding wedges interconnected by means of a threaded shaft such as illustrated in the patents of King and Mafera (U.S. Pat. Nos. 1,045,984 and 2,709,571 respectively).

A number of approaches to furniture leg stabilizers use the wedge concept. However, there are a number of drawbacks. U.S. Pat. No. 4,830,320 by Robert K. Bellows, incorporated herein by reference, and the patents of Costar (U.S. Pat. No. 3,030,730), Bogle (U.S. Pat. No. 4,625,489), and Jensen (U.S. Pat. No. 4,135,335) all suggest using a combination of wedges having ridges which intermesh with each other for stability. This however does not provide for small adjustments typically needed (as small as 1 millimeter) and for larger adjustments (up to 15 millimeters) stability is compromised.

While Bellows incorporates ridges and semi-flexible material to decrease the likelihood that the wedge will slip out from under the table leg, it is still vulnerable to side thrusts. Further, one needs two separate wedges to provide a large height adjustment. From the background it can be seen that there is a need for a device that provides greater adjustment height without having two separate pieces and without having a chance for coming apart when the table is bumped.

SUMMARY OF THE INVENTION

It is an object of the present invention to provide a novel and useful device for use with articles of furniture which can be placed between a lower support portion of an article and its support surface in order to prevent the article of furniture from wobbling, tipping and the like.

It is another object of the present invention to provide an inexpensive device which may be used by restaurant owners and other business proprietors to level and stabilize articles of furniture.

Another object of the present invention is to provide a portable, lightweight device for stabilizing articles of furniture which is small in size so it may be used by an individual to temporarily stabilize a table or other article of furniture during use, after which the person may remove it so that it may be retained by the person for re-use.

A further object of the present invention is to provide a stabilizer device that requires no tools or turning and may be used to provide adjustment between 0.1 and 2 centimeters in the support, stabilization and levelling of articles of furniture.

A still further object of this invention is to provide an interlocking wedge device which may be employed as a stiff, yet flexible, stabilizing support against tipping and jarring forces.

In broad form then, a device is provided which is adapted for insertion between a support surface and the lower support portion of an article in order to stabilize and position the article on a support surface. Two interlocking parts of the device are pushed together until the upper surface contacts and supports the lower support structure to stabilize the article of furniture at a desired position.

These and other objects of the present invention will become more readily appreciated and understood from consideration of the following description of the preferred embodiments when taken together with the accompanying drawings.

BRIEF DESCRIPTION OF THE DRAWINGS

FIG. 5a–c show the cross-sectional views of the T shaped part 1 of FIG. 4 at the three locations indicated.

FIG. 6 is a bottom view of the T shaped part 1 of FIG. 4 showing the supporting thin ribs.

FIG. 7a is a drawing of U shaped part 2 showing the top view and locations of cross-sections for the views in FIG. 8. FIG. 7b is a perspective sectional view of the discontinuous groove.

FIG. 8a–d are cross-sectional views of the U shaped part 2 of FIG. 7a.

DETAILED DESCRIPTION OF THE PREFERRED EMBODIMENT

The present invention is directed to a device which is insertable between a support surface and a lower portion of an article in order to stabilize and level an article on the support surface. It is intended to be of simple construction and inexpensive materials so it may be used by restaurant owners and others to quickly and easily stabilize articles of furniture and be portable so that people going out to restaurants may carry the device with them.

Figure 1:
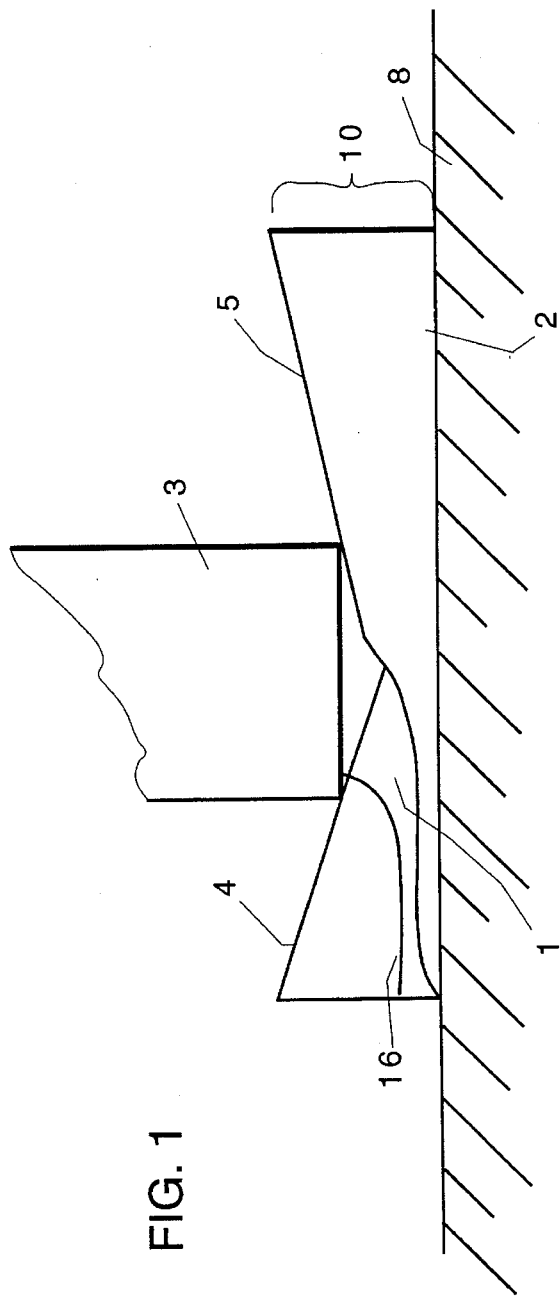
FIG. 1 is a side view of a version of the stabilizing device between a support leg of an article of furniture and a support surface.

A first embodiment of the present invention is directed to a stabilizer device 10 which may support an article of furniture, FIG. 1. Stabilizing device 10 is adapted for insertion between a lower support portion of an article of furniture, such as a table leg 3, and a support surface 8 in order to stabilize the article of furniture against tipping, rocking or other unwanted wobbling movement. As seen in FIG. 1, the two interlocking parts 1 and 2 support leg 3 which rests directly on stabilizing device 10, which is, itself, positioned on support surface 8.

Figure 2:
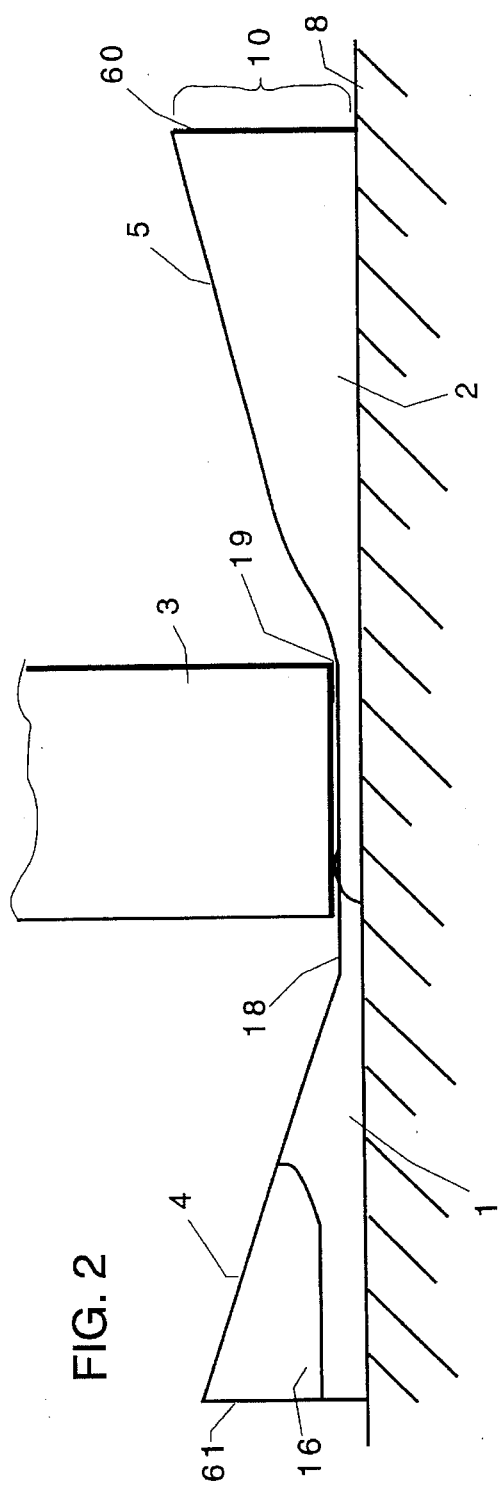
FIG. 2 is a side view of the stabilizing device shown in FIG. 1 in the most open position.

The function of the stabilizing device is illustrated in comparing FIGS. 1 and 2 which show the stabilizing device in its most closed and most open positions respectively. As the two parts are pushed together the leg 3 is forced upward until the article of furniture is stabilized. By pulling the parts to the outermost position (limited by end buttons and dimples described below) a very broad and thin surface is provided for making small adjustments in a stable fashion.

As shown in FIG. 1, the upper surfaces (4 and 5) of Parts 1 and 2 at the thicker parts are smooth and sloped down toward the middle. The inclines could be non-linear and have a similar effect. The surface also could contain ridges rather than be smooth. Part 1 also has side wings 16 to provide greater surface contact.

As shown in FIG. 2, the upper surfaces of Parts 1 and 2 at the thinner, central parts (18 and 19 respectively) are flat. This allows for minimal correction. FIG. 2 also identifies the outer or first end surface 60 of Part 2 and the outer or first end surface 61 of Part 1 which can be perpendicular to the support surface 8.

Figure 3:
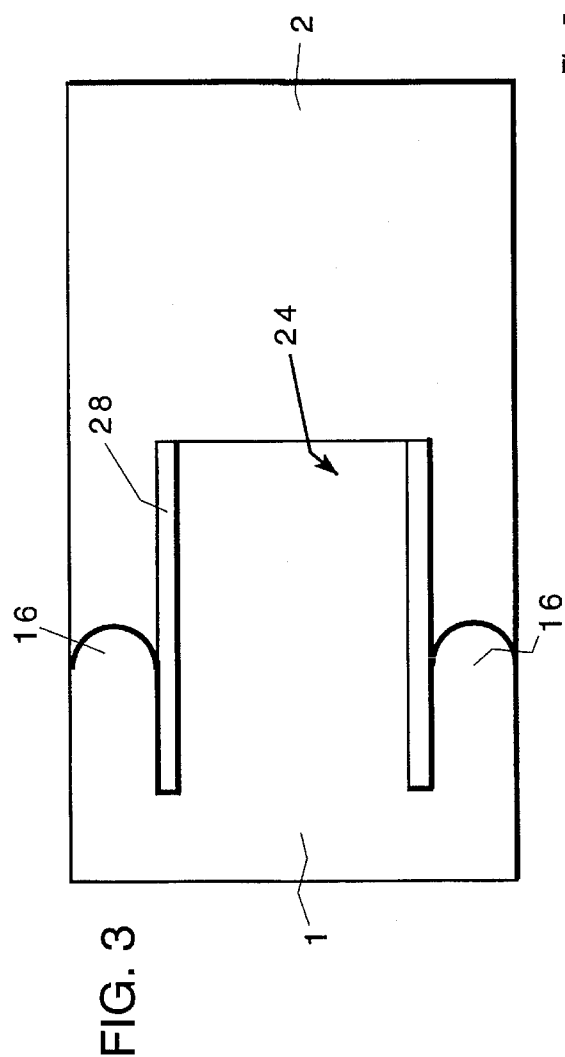
FIG. 3 is a top view of the stabilizing device shown in FIG. 1 showing the interlocking of the two parts in the fully closed position.

As shown in FIG. 3, Part 1 comprised of an inner part 24 and a mating edge 28 slides inside the central channel of Part 2. This interlocking feature has certain benefits described below. The overall rectangular shape of the device works well with different designs of table leg terminations such as long spindle legs and pedestal legs which have an extended horizontal portion. The top view of the wings 16 of Part 1 are seen.

Figure 4:
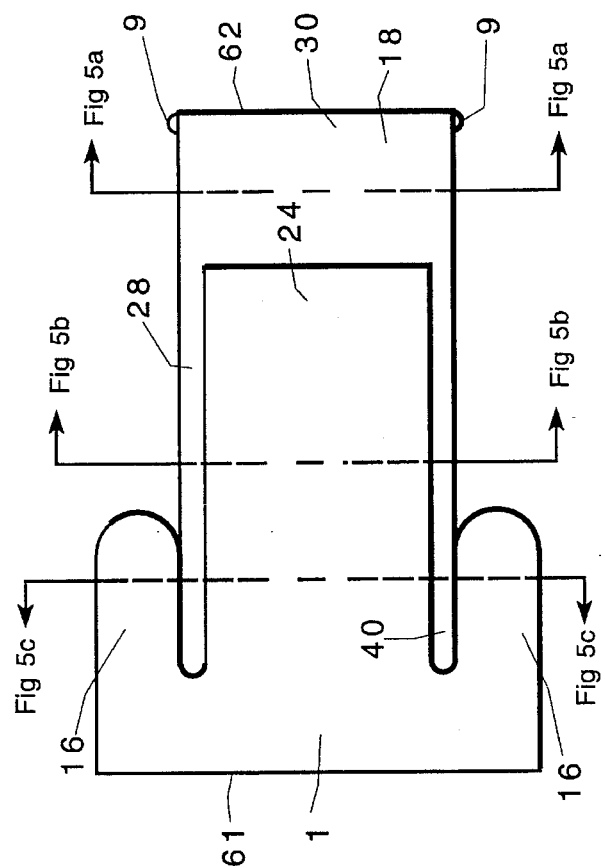
FIG. 4 is a top view of the T shaped part 1 showing locations of the cross-sectional views shown in FIG. 5a to 5c.

As shown in FIG. 4, Part 1 has side flares 28 running parallel to the bottom which slide on tabs 48, 49, and 50 on Part 2 (see FIG. 7a). Said flares are an extension of the flat lower surface 30 of Part 1, the inclined section 24 of part 1 tapers into the flat section at some distance back from the end. Side wings 16 provide a wider surface to facilitate manipulation. Slot 40 accommodates an insert in the mold (when manufactured by plastic injection molding) to form the lip along the bottom. The first outer end 61 of Part 1 is identified along with the second inner and opposite end 62. The two end buttons or nubs 9 at end 62 in combination with dimples 58 and 59 of Part 2 (see FIG. 9a) provide a stop for Part 1 from separating from Part 2.

FIG. 5a–c shows the cross-sectional views of Part 1 at the three locations indicated in FIG. 4. The support ribs 35 carry the weight of the object being supported. They are fashioned as ribs rather than solid material to facilitate injection molding and to reduce material cost. FIG. 5a shows the flat upper surface 30 and lower surface 32 and the lip 28 which catches the tabs in Part 2. FIG. 5b is the cross-section through the lower part of the sloped surface 24 showing the cut out portions 34 forming ribs 35. FIG. 5c is the cross-section through the upper part of the sloped surface 24 which includes the two side wings 16. Also seen in this view are the slots 40 and side wall cross-section of side wings 16.

FIG. 6 illustrates the bottom view of Part 1 showing the support ribs 35 and hollowed out sections 34 from the bottom side. It also shows a flat portion 14 suitable for a product inscription 15.

As shown in FIG. 7a, Part 2 is "U"-shaped to accommodate the central part of Part 1. This top view and associated cross sectional views in FIG. 8a–d illustrate the profile of the two fingers 19 which have inside grooved surfaces 46 consisting of alternately lower 48, 49 and 50 tabs and upper tabs 51 and 52. These four pairs of tabs 48, 49, 50, and 51 form the groove 46 which holds the lower surface of Part 1 in the same plane (up and down) as the lower surface of Part 2 and holds Part 1 in line (left to right) with the line of the inner surface of the "U" in Part 2. Discontinuity in the upper and lower part of the groove enables one to injection mold the part without expensive and complicated side actions. These discontinuities and formation of a groove 46 are further illustrated in the perspective view of FIG. 7b. The positioning of the stop dimple 59 is also shown. The thicker first end 60 of Part 2 is identified along with the thinner opposite second end 63.

Figure 8A:
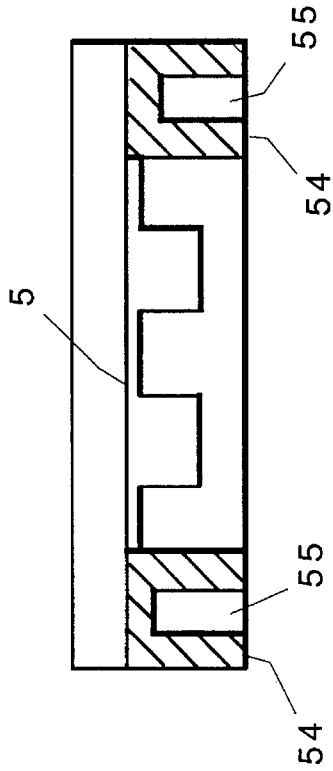
Figure 8B:
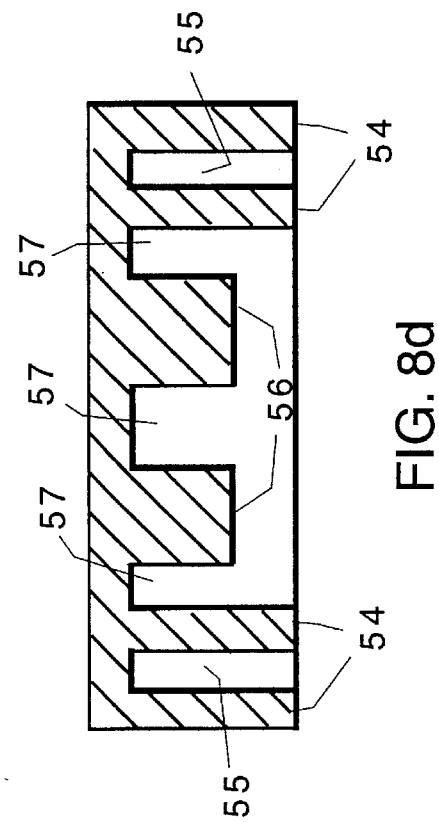
Figure 8C:
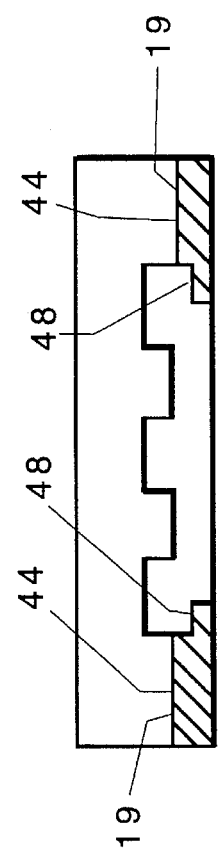
Figure 8D:
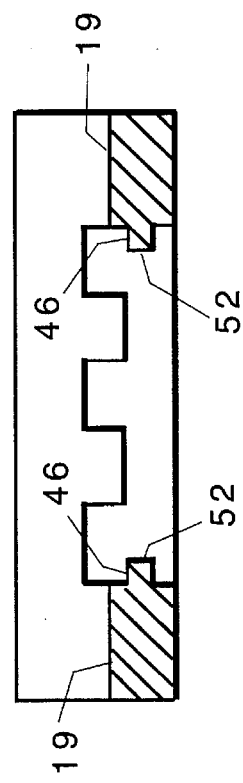

FIG. 8a–d shows the cross-sectional views of U shaped Part 2 at the places indicated in FIG. 7. FIG. 8a shows the cross-section at A–A' at the outer portion 44 of fingers 19 where there is a lower tab 48. FIG. 8b shows the cross section at B–B' of FIG. 7 where there is an upper tab 52 and where material is removed to form the upper part of a lip 46. FIG. 8c shows the cross section at C–C' of FIG. 7 where there are support ribs 54 and hollowed out regions 55. FIG. 8d shows the cross section at D–D' of FIG. 7a where support ribs 54 are formed by hollowing out areas 55 and where internal ribs 56 are formed by hollowing out grooves 57.

Figure 9B:
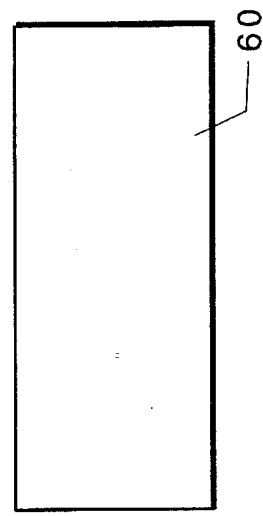
FIG. 9b is end view of the U shaped part 2.
Figure 9A:
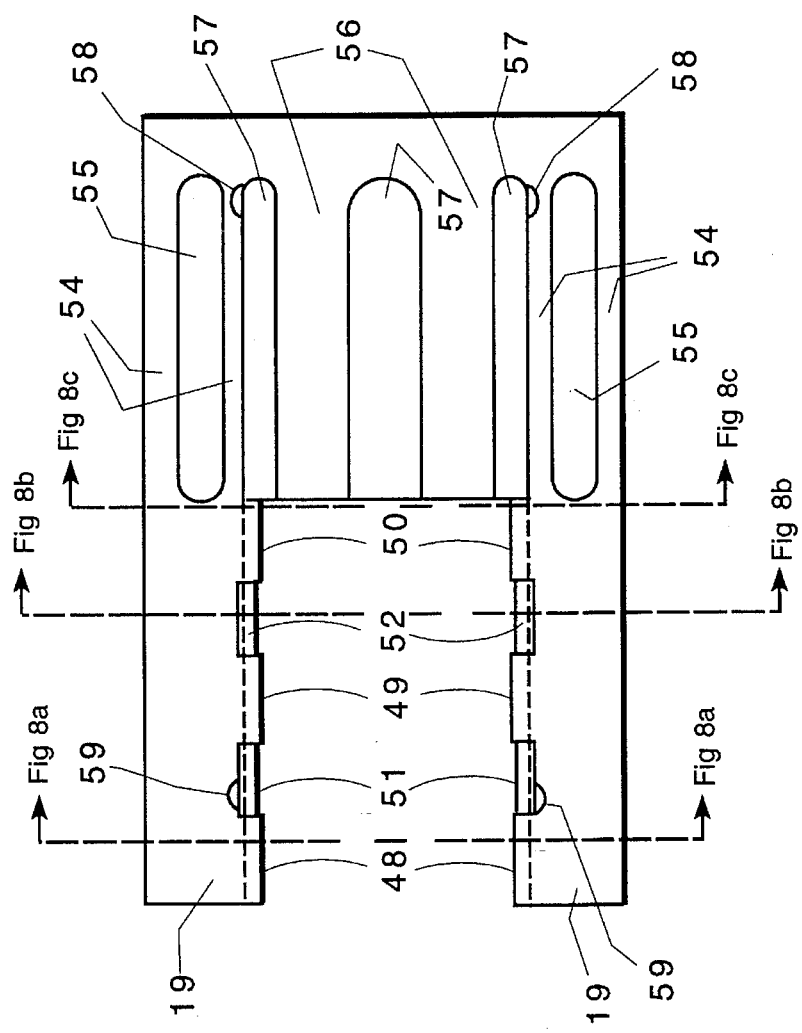
FIG. 9a is a bottom view drawing of the U shaped part 2 showing supporting thin ribs.

FIG. 9a illustrates the tab pairs 48–52 as seen from a bottom view. The bottom view also shows support ribs 54 and hollowed out portions 55 similar to those of Part 1 (35 and 34 respectively). The inner ribs 56 and hollowed out portions 57 are raised increasing amounts from inner part of the U to the back 60 forming an inner slope which progresses from less than 1 mm to the full thickness at the back surface 60. This slope which is otherwise hidden from view is such as to accommodate the slope of surfaces 4 and 18 of the part 1 (as seen in FIG. 2).

FIG. 9 also shows a pair of dimples 58 and 59 which mate with the bumps or nubs 9 of Part 1 to secure the pieces at their outermost extension and innermost closed positions.

FIG. 9b shows the back or end view of the first end of Part 2 (60). This is the thickest end and its height along with the height of the corollary region 61 of Part 1 determine the limits in height adjustment.

Figure 10B:
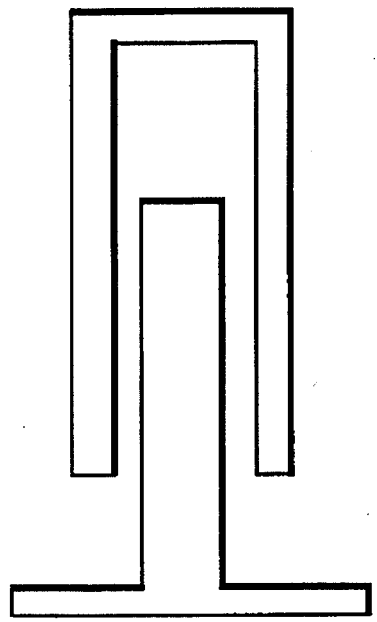
FIG. 10b is a schematic illustration of a different interlocking design having a T with a U.
Figure 10A:
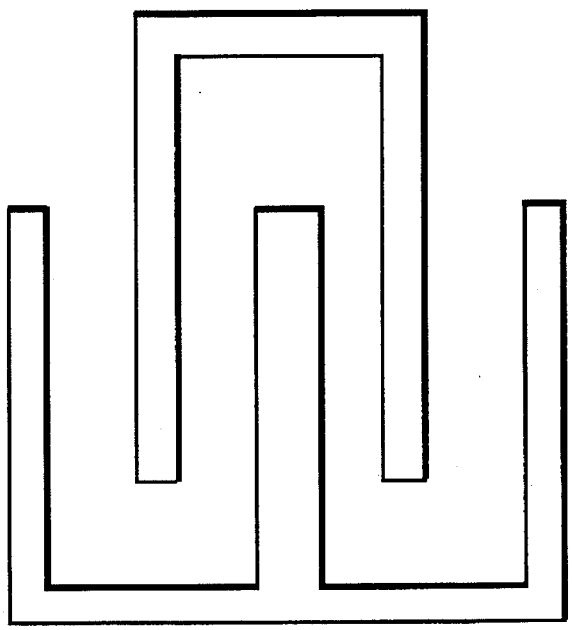
FIG. 10a is a schematic illustration of a first interlocking design having an E and U.

FIG. 10a,b shows the alternative schemes for achieving interlocking of two parts. FIG. 10a illustrates the interlocking between an E and a U. FIG. 10b illustrates the potential for interlocking between a T and a U. In FIG. 10a, grooves formed by tabs could be on the outer surface of the U and tabs could be on the inner part of the outside fingers of the E.

It should be appreciated from the foregoing that stabilizing device 10 thus is defined by two interlocking parts each having contoured upper surfaces which vary in slope from 0 to 45 degrees depending on the region of the wedge-like parts.

Stabilizing device 10 is preferably formed by injection molding of a high friction material which is operative to prevent slippage once inserted between the lower support structure of the article of furniture and the support surface. Preferably, stabilizing device 10 is constructed of a relatively stiff, yet flexible, material and may be a plastic material selected from a group consisting of polypropylene, ABS, High Impact Styrene, hard rubber or polycarbonate. Otherwise, the material may be a stiff, but compressible material which is resilient. These materials provide a resilient support to help stabilize the article of furniture against jarring or tipping forces. Various metals as aluminum, brass, bronze and others may also be used to provide special effects but with some compromise in compressibility. Other materials known in the art are contemplated by this invention although the foregoing are the preferred materials. Indeed, and although not shown in the drawings, stabilizing device 10 could be constructed of any material that may then either be layered or coated with a thin film of high friction material, again as is known in the art.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A stabilization device comprising:

a) a first part having at least one upper surface and at least one lower surface wherein said first part at least one upper surface is inclined relative to said first part at least one lower surface;

b) a second part having at least one upper surface and at least one lower surface wherein said second part at least one upper surface is inclined relative to said second part at least one lower surface wherein said first and second parts are constructed of a relatively stiff, yet flexible, material; and c) interlocking means for interlocking at least a portion of said first part upper surface in contact with said second part lower surface and for interlocking at least a portion of said second part upper surface in contact with said first part lower surface.

2. A device as in claim 1, wherein at least one of said parts has a first end and a second end, said first end being thicker than said second end and the portion between said ends being tapered.

3. The device of claim 1 wherein at least one of said parts has at least one finger.

4. The device of claim 3 having a shape, chosen from the group consisting of T, U, and E shapes.

5. The device of claim 4 wherein said first part is T shaped and said second part is U shaped.

6. The device of claim 1 wherein said interlocking means further comprises a groove.

7. The device of claim 6 wherein said groove is formed by upper and lower tabs.

8. The device of claim 6 further comprising at least one projection for sliding in said groove.

9. The device of claim 1 wherein said interlocking means provides alignment of said sections in two orthogonal planes.

10. The device of claim 1 wherein said parts are adjustably interlocking.

11. The device of claim 1 wherein at least one of said parts further comprises side wings.

12. The device of claim 1 wherein said parts are made from material chosen from the group consisting of polypropylene, styrenes, ABS, rubber, polycarbonate, metals, composites, wood and paper.

13. The device of claim 1 wherein said interlocking parts have a relatively flat section for accommodating a furniture leg.

14. A device as in claim 1 whereby indents or dimples and nubs are incorporated into two parts to provide positioning stability in fully closed and fully open positions.

15. The device of claim 1 further comprising a place for a logo or message.

16. The device of claim 1 wherein at least one of said parts is resilient and compressible.

17. The device of claim 1 wherein at least one of said parts is a high friction material.

18. The device of claim 1 wherein at least one upper surface is provided with cross-running ridges.

19. A device as in claim 1 for stabilizing and/or leveling appliances, machinery and instruments.

* * * * *